Jan. 13, 1953

H. F. TAPP ET AL
MEASURING THE AVERAGE TEMPERATURE
OF LIQUID IN STORAGE TANKS 2,625,043

Filed April 4, 1952

INVENTORS
HARRY F. TAPP
GEORGE D. ROBINSON.

BY Chapin & Neal

ATTORNEYS

Jan. 13, 1953 H. F. TAPP ET AL 2,625,043
MEASURING THE AVERAGE TEMPERATURE
OF LIQUID IN STORAGE TANKS
Filed April 4, 1952 4 Sheets-Sheet 2
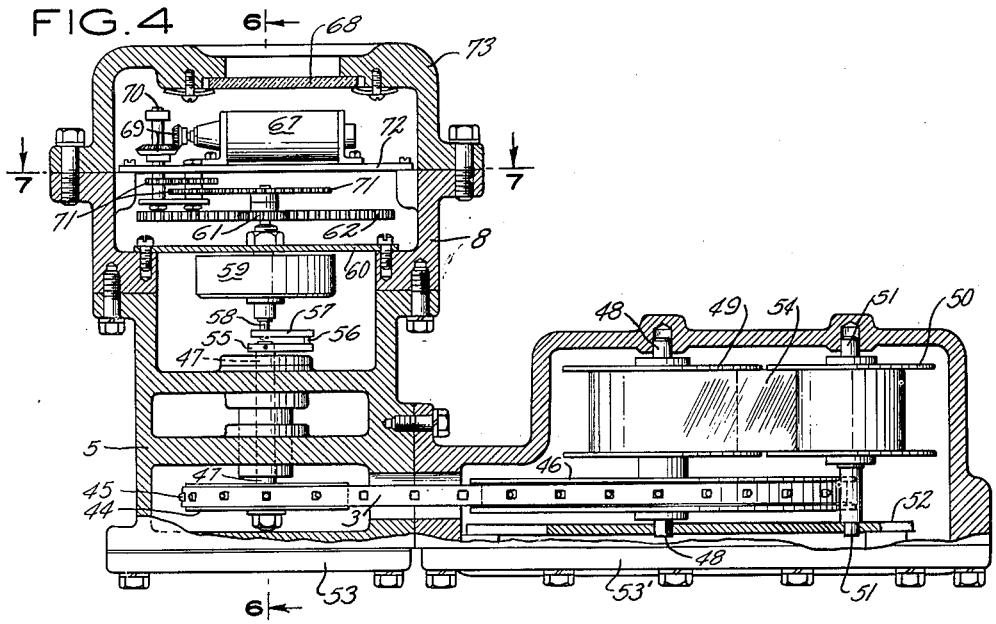
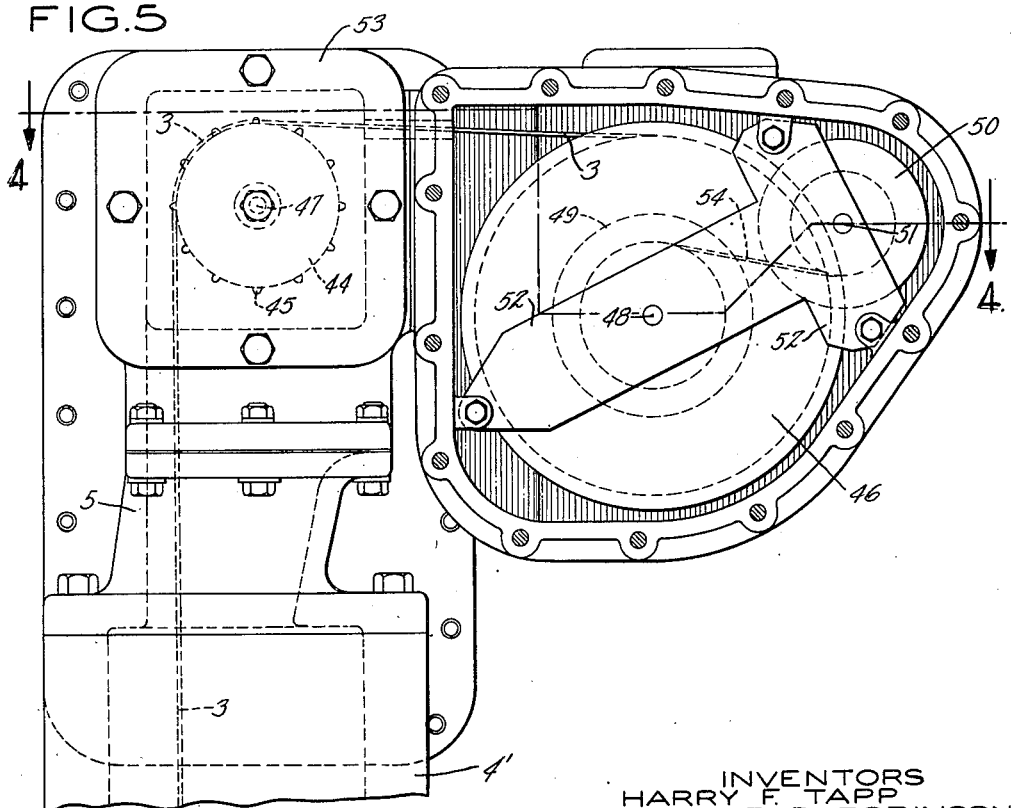
INVENTORS
HARRY F. TAPP
GEORGE D. ROBINSON
BY Chapin & Neal
ATTORNEYS

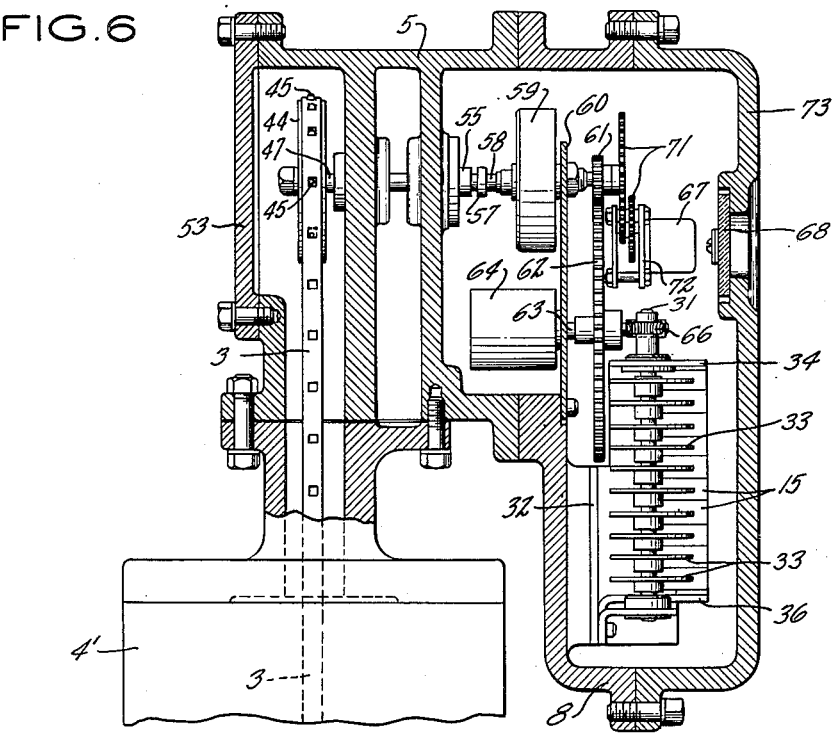
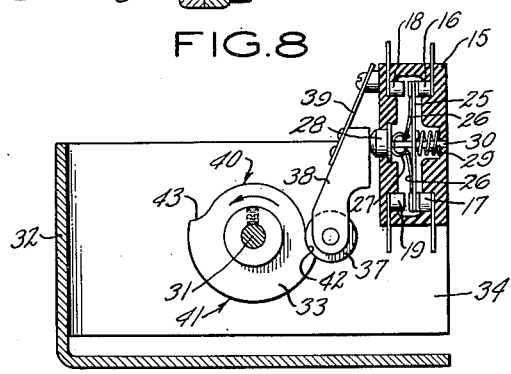
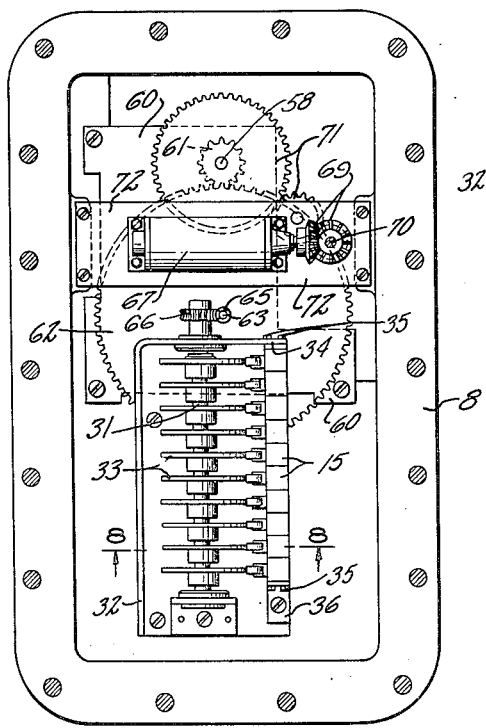

Jan. 13, 1953 H. F. TAPP ET AL 2,625,043
MEASURING THE AVERAGE TEMPERATURE
OF LIQUID IN STORAGE TANKS
Filed April 4, 1952 4 Sheets-Sheet 4

INVENTORS
HARRY F. TAPP
GEORGE D. ROBINSON
BY *Chapin & Neal*
ATTORNEYS

Patented Jan. 13, 1953

2,625,043

UNITED STATES PATENT OFFICE 2,625,043

MEASURING THE AVERAGE TEMPERATURE OF LIQUID IN STORAGE TANKS

Harry F. Tapp, Longmeadow, and George D. Robinson, Agawam, Mass., assignors to Gilbert & Barker Manufacturing Company, West Springfield, Mass., a corporation of Massachusetts Application April 4, 1952, Serial No. 280,462

6 Claims. (Cl. 73—342)

This invention relates to improvements in apparatus for measuring the average temperature of liquid in a storage tank.

In the petroleum industry, it is the custom to sell the liquid products, such as fuel oils, gasoline and the like, on the basis of the volume at 60° Fahr. When liquid is drawn from the tank, the volume is determined by the difference in level of liquid in the tank; the temperature of the liquid is measured and then the volume at 60° Fahr. is calculated. Level-responsive measuring apparatus is available for showing directly on a meter the level of liquid in the tank. Determination of the temperature of the liquid, easily and with close accuracy, has been made possible through electrical apparatus by which the average temperature of the liquid, when the tank is filled to any one of a plurality of selected levels, can be indicated directly on a measuring instrument. This temperature measurement apparatus utilizes a temperature-sensitive resistor, which is immersed in the liquid in the tank and extends from the bottom thereof upwardly through and to the surface of the liquid. This resistor is connected in circuit with a suitable measuring instrument such as a milli-ammeter, and a source of electricity. Changes in temperature of the liquid cause changes in the resistance of the resistor and thus changes of current in the circuit. These changes in current are shown on the measuring instrument, which is graduated to read in degrees Fahrenheit. The resistance of the resistor is uniformly distributed throughout its length and the temperature indicated is average temperature over the depth of oil. In practice, a series of resistors, of equal resistance, extend from the bottom of the tank upwardly and terminate at different levels and these resistors can be selectively connected, one at a time, in circuit with the measuring instrument. For any given depth of liquid in the tank, the resistor having a length nearest to this depth is selected. An operator has to observe the depth of oil in the tank and then manually move a selector switch to the proper position to connect the desired resistor into the circuit of the measuring instrument.

This invention has for its main object the provision of means for automatically connecting into the circuit of the measuring instrument the proper resistor for any particular depth of liquid that exists in the tank.

More particularly, the invention has for an object the provision of selector switches for the resistors and switch actuators, which are movable responsive to changes in the level of liquid in the tank, whereby on a change in level to a predetermined extent, one resistor is cut out of the circuit of the measuring instrument and the next resistor in the series is substantially immediately cut into the circuit. Thus, one resistor is always in the measuring circuit and this one is the proper one, that is, the one having a length nearest to the then existing depth of liquid in the tank. The operator merely needs to observe the measuring instrument, which shows at all times the average temperature of the liquid in the tank.

This invention will be disclosed with reference to the accompanying drawings in which, Fig. 1 is a small-scale, fragmentary, sectional elevational view of a storage tank showing an apparatus, embodying the invention, mounted on the roof of the tank;

Fig. 4 is a sectional plan view taken on the line 4—4 of Fig. 5;

Fig. 5 is an elevational view of the apparatus shown as mounted on top of the storage tank;

Figs. 6 and 7 are sectional views taken on the lines 6—6 and 7—7, respectively, of Fig. 4;

Fig. 8 is a sectional view taken on the line 8—8 of Fig. 7; and

Figs. 9, 10, 11, 12, 13, 14, 15, 16, 17 and 18 are views showing the various switch-actuating cams.

Figure 1:
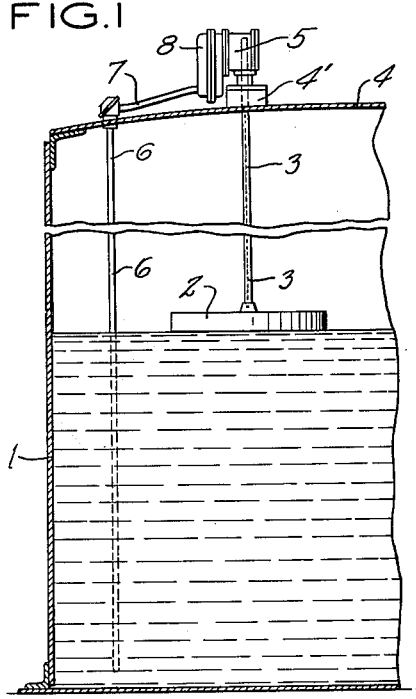

Referring to these drawings, there is shown in Fig. 1 a storage tank 1, such as is commonly used in the petroleum industry and is usually of large diameter, say for example, 90 feet, and of substantial height, say for example 50 feet. In this tank is a float 2, secured to one end of a tape 3, which passes upwardly in the tank through the gauging hatch 4' on the roof 4 and into a casing 5, which houses mechanism, to be later described, for actuating a meter showing the level of liquid in the tank. Also in tank 1 is a cable 6, which contains the various resistors used for temperature measurement. This cable extends from the bottom of tank 1 vertically upwardly and through roof 4, into and through a conduit 7 and into a casing 8, which is attached to casing 5 and houses the selector switches for the various resistors and the associated actuating mechanism later to be described.

Figure 3:
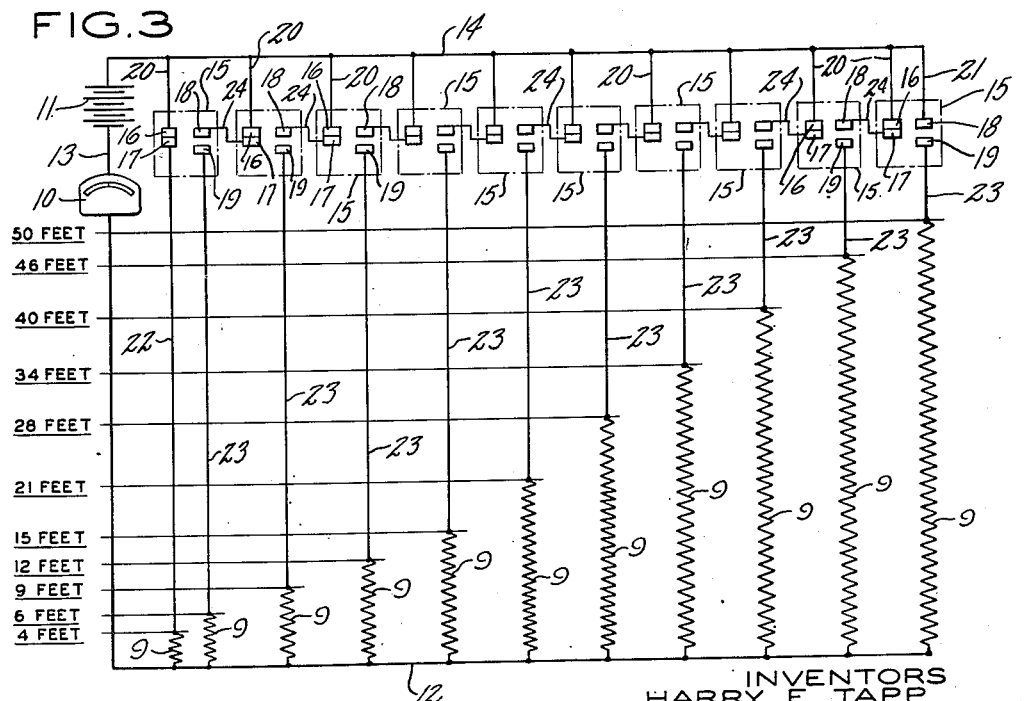
Fig. 3 is a diagram showing the electrical connections between the selector switches, temperature-sensitive resistors, battery and temperature-indicating instrument of the apparatus.
Figure 9:
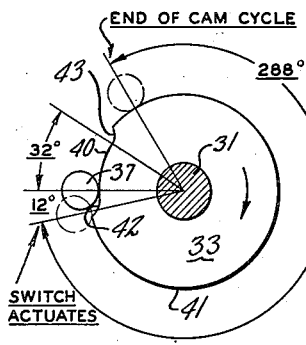
Figure 10:
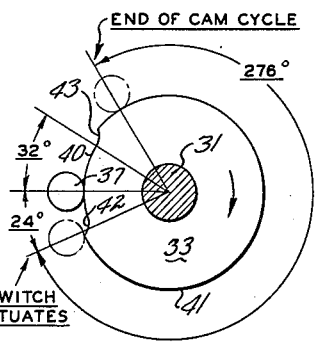
Figure 11:
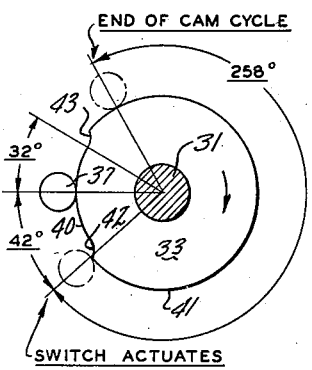
Figure 12:
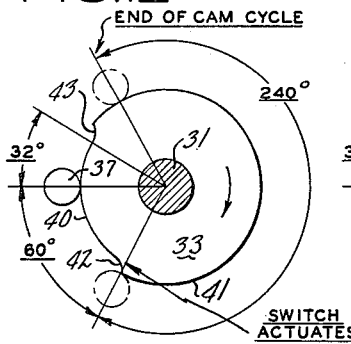
Figure 13:
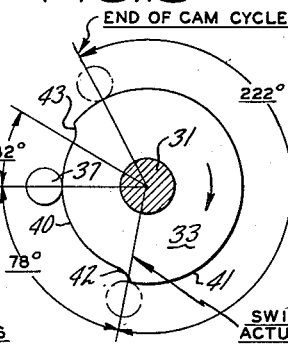
Figure 14:
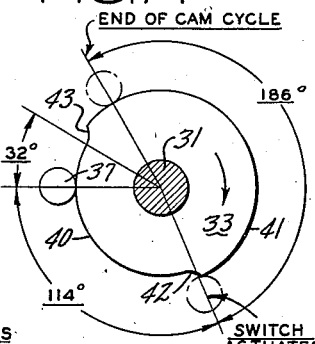
Figure 15:
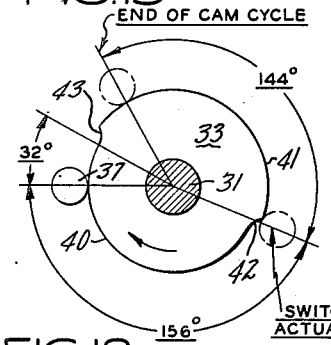
Figure 16:
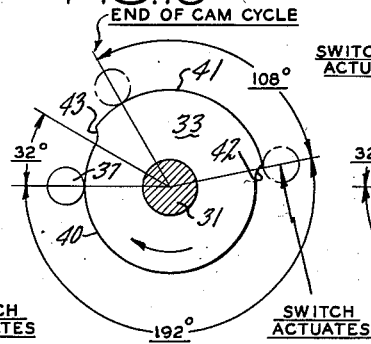
Figure 17:
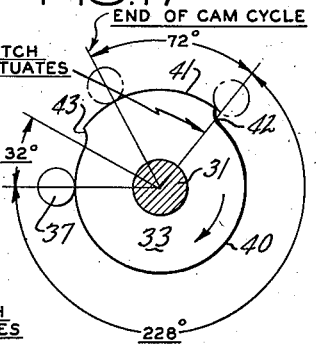
Figure 18:
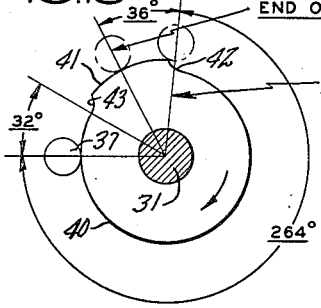

The resistors are shown diagrammatically at 9 in Fig. 3. Each resistor has the same resistance (in this example 100 ohms) uniformly distributed throughout its length. The depth location in the tank of this series of resistors is indicated in the diagram. The resistors extend upwardly from the bottom of the tank, terminating at different selected levels, as indicated, by way of example by the vertical scale of figures at the left of the diagram, these figures representing depth in feet in the tank. The resistors may, for example, be wound like coil springs and then distended to the different lengths required, the resistor for the depth of 4 feet being most closely wound and the resistor for the depth of 50 feet being wound most openly.

These resistors 9 are adapted to be connected one at a time in an electrical circuit with a suitable measuring instrument 10, which may be of the milli-ammeter type, graduated to read in temperature, as in degrees Fahr., and a suitable power source, such as the battery 11. The circuit, as shown, includes a conductor 12, to which the lower terminals of all the resistors 9 are connected and which is connected to one terminal of instrument 10; a conductor 13, which connects the other terminal of this instrument to one terminal of battery 11; and a conductor 14, which is connected to the other terminal of the battery and extends to the selector switches, indicated generally at 15. Each selector switch includes two pairs of contacts, the contacts of the first pair being designated 16 and 17 and the contacts of the second pair being designated 18 and 19. Each switch is biased so that the contacts 16 and 17 are normally connected together and the contacts 18 and 19 are normally disconnected, as shown. Actuation of the switch against its bias reverses the conditions, causing the contacts 16 and 17 to be disconnected and the contacts 18 and 19 to be connected together. Each contact 16 is connected by a conductor 20 to the conductor 14 and the contact 18 of the last switch of the series (for the highest level) is also connected to wire conductor 14, as by a conductor 21. The upper terminal of the first resistor 9 of the series (for the lowest level) is connected by a conductor 22 to the contact 17 of the first switch of the series. The upper terminal of each of the other resistors 9 is connected by a conductor 23 to the contact 19 of the corresponding switch of the series. The contact 17 of each switch, except the first one of the series, is connected by a conductor 24 to the contact 18 of the preceding switch of the series.

With all switches 15 in normal position, which occurs, for example, when the depth of the liquid in the tank is below 4 feet, the first resistor 9 is connected in the circuit of the measuring instrument 10 because its first pair of contacts 16 and 17 will be connected together, as shown. All other resistors 9 will be disconnected from the circuit because the second pair of contacts 18 and 19 of every switch of the series will then be disconnected. As the liquid rises in the tank to the level of 4 feet, the first switch of the series will be actuated, thereby disconnecting its first pair of contacts 16 and 17 and thus disconnecting the first resistor 9 of the series from the circuit of the measuring instrument, and substantially immediately thereafter, connecting its second pair of contacts 18 and 19, and thus causing the second resistor 9 of the series to be connected in the circuit of the measuring instrument through the conductor 24 and the then interconnected first pair of contacts 16 and 17 of the next switch in the series. When the liquid in the tank reaches the level of 6 feet, the second switch 15 of the series will be actuated, thereby disconnecting its first pair of contacts 16 and 17 and thus disconnecting the second resistor 9 of the series, and immediately thereafter, connecting its second pair of contacts 18 and 19 and thus connecting the third resistor 9 into the circuit. Each switch, after having been actuated, is held in actuated position, as the liquid in the tank continues to rise. Thus, the various resistors 9 will be successively connected into the circuit of the measuring instrument 10 and subsequently disconnected until the liquid reaches the level of 46 feet, when the last switch of the series is actuated, such switch, when its contacts 18 and 19 are connected together, connecting the last resistor 9 of the series in circuit with the measuring instrument 10 and leaving it in the circuit until the liquid in the tank falls to the level of 46 feet.

As the liquid falls below this level, the last switch of the series will be allowed to assume its normal position, disconnecting its second pair of contacts 18 and 19 and thus disconnecting the last resistor 9 of the series, and connecting together its first pair of contacts 16 and 17, whereby the resistor 9 for the next lowest level is connected into the circuit of the measuring instrument through the conductor 24 and the then interconnected second pair of contacts 18 and 19 of the next lower switch in the series. The resistors 9 are thus successively connected into the circuit, as the liquid in the tank falls, until the level falls below four feet when the first switch of the series causes the first resistor of the series to be connected in the circuit of the measuring instrument and left in circuit at all levels below 4 feet. The levels named are merely given by way of illustrative example and may, obviously, be varied as desired.

One of the switches 15 is shown in its normal position in Fig. 8. The parts are mounted in an enclosure of suitable insulating material. The contacts of each pair are connected together by a switch member 25, which is of resilient metal and has struck out therefrom two parts 26, forming toggle springs. The inner ends of the springs 26 are engaged one in each of two recesses formed in a bent metal part 27, which is fixed to a push button 28 of insulating material. A spring 29, coiled around a rod 30, which is fixed to button 28, acts between a wall of casing 15 and a shoulder on the rod, to bias the springs 26 into one extreme position, in which the member 25 is so positioned as to connect the first pair of contacts 16 and 17 and disconnect the second pair of contacts 18 and 19. Pressure on button 28 will force the toggle springs 26 inwardly through the opening in member 25 until they cross to the other side thereof, whereupon the member 25 is moved with a snap action from the illustrated position to another position, in which the member 25 connects the second pair of contacts 18 and 19 together. The switch, chosen as an illustrative example, is of the type shown in the U. S. patent to Hausler No. 2,332,911, granted October 26, 1943, to which reference may be had for a more complete disclosure, if necessary or desired.

The switch-actuating mechanism is shown in Figs. 6, 7 and 8. It includes a shaft 31, mounted in suitable bearings provided in a frame 32, which is located in and fixed to casing 8. This shaft is adapted to be turned in opposite directions by the rise and fall of float 2 by a suitable transmission, including the described tape 3 and other parts later to be described in detail. Fixed to this shaft 31, preferably in a manner to enable angular adjustment, as indicated, are a plurality of cams 33 one for each switch 15 and located adjacent the same. The switches are mounted side by side in abutment and held together by two long bolts 35 which clamp them between a wall 34 of frame 32 and an angle iron 36 fixed to frame 32. The button 28 (Fig. 8) of each switch is adapted to be pressed inwardly by its cam, acting through a cam follower 37 on the free end of a rocker arm 38, which is connected to the switch casing 15 for swinging movement by means of a flat spring 39. The periphery of each cam 33 is divided into a low dwell portion 40 a high dwell portion 41 and connecting transition portions 42 and 43. When a follower 37 rides on the low dwell portion 40 of its cam 33, the button 28 of its switch 15 occupies its outer position and the two pairs of contacts 16, 17 and 18, 19 assume the described normal positions, to which they are biased. When the follower 37 is engaged by the part 42 of its cam, the button 28 is moved inwardly to actuate the switch 15 and reverse the positions of the two pairs of contacts, as described. When the follower 37 rides on the high dwell portion 41 of the cam, the button 28 of its switch is maintained in its inwardly-pressed or actuated position.

The cams 33 are shown one in each of Figs. 9 to 18 and in the order in which they occur in the series. The cams are generally alike and differ only in the angular extent of the low dwell portions 40, which successively increase from the first to the last cam of the series, and in the angular extent of the high dwell portions 41 which successively decrease from the first to the last cam of the series. The end of the high dwell portion 41 of each cam 33 has the same angular position on shaft 31. As viewed in Figs. 9 to 18, the shaft 31 is adapted to be turned clockwise and counterclockwise by the rise and fall, respectively, of the float 2 in tank 1. The cams are shown in the positions, which they occupy when there is two feet of liquid in tank 1. This is usually the lowest level to which liquid can be drawn out of the tank. The cam shaft 31, as herein shown, is adapted to be turned 6° by the travel of float 2 through the distance of one foot. Each cam follower 37 rides on the low dwell portion 40 of its cam. As the cams turn clockwise 12°, the rise 42 of the first cam of the series, shown in Fig. 9, will have engaged and moved its follower 37 to actuate the first switch 15 of the series. On another 12° movement of the cams, the second cam of the series, shown in Fig. 10, will have moved its follower 37 to actuate its switch 15 and so on, the various switches of the series being successively actuated, and each being held in actuated position by the high dwell portion 41 of its cam until the last switch 15 of the series is actuated, when the liquid has a depth of 46 feet. The float 2 can continue to rise to the top of the tank 1, the dwell portion 41 of the last cam 33 shown in Fig. 18, being of sufficient extent for the purpose. As the liquid is drawn out of tank 1, the shaft 31 will be turned counterclockwise and the cams 33 will successively allow the switches 15 to move back to their normal positions, at the various levels indicated.

The transmission between the float 2 and cam shaft 31 may, of course, vary as desired, the only necessary condition being that the cam shaft be turned back and forth by, and in proportion to, the rise and fall of the float and to an adequate extent. In the present example, the cam shaft 31 is driven from a level-indicating mechanism actuated by float 2. Referring to Fig. 5, which shows the casing 5 mounted on top of the gauging hatch 4' on the roof 4 of tank 1, the tape 3 passes vertically upward in the hollow casing 5, part way around a sprocket 44, which has pins 45 to engage in perforations in tape 3, and then horizontally to the right to a drum 46 on which the tape is wound. The sprocket 44 is fixed to one end of a shaft 47, mounted, as indicated in Fig. 4, in suitable bearings provided in the casing 5. Fixed to the shaft 48 of the drum 46 is a second drum 49 and adjacent thereto is a similar drum 50, fixed to a shaft 51. The shafts 48 and 51 at one end are supported in a wall of casing 5 and at their other ends in a frame 52, secured as shown in Fig. 5 to casing 5. Covers 53 and 53', secured as indicated to casing 5, provide for access to the compartments in which the sprocket 44 and the drums 46, 49 and 50 are respectively located. The cover 53' is omitted in Fig. 5, the better to show interior mechanism. The drums 49 and 50 are connected by a spring 54. One end of this spring is fixed to one drum and the other end to the other drum. As the spring unwinds from one drum, it winds upon the other. It exerts a constant torque tending to turn the large drum 46 in a clockwise direction and thus balance the weight of the float. In the present example, the spring 54 is of a special type, which is known by the trade mark "Neg-A-Tor," and provides constant torque as it winds and unwinds.

The shaft 47 (Fig. 4) has fixed on its inner end a crank 55, the pin 56 of which is engaged in a slot in another crank 57, which is fixed to a shaft 58. The latter drives the movable element of a potentiometer, the stationary element of which is shown at 59, suitably fixed to a plate 60, secured in the upper part of casing 8 and located above the cams and the selector switches. Shaft 58 extends through plate 60 and carries a pinion 61 which drives a gear 62, which, as shown in Fig. 6, is fixed to a shaft 63. The latter carries the movable element of a second potentiometer, the stationary element of which is shown at 64 fixed to plate 60. The shaft 63 has fixed thereto a worm 65 (Fig. 7) which drives a worm gear 66, fixed to cam shaft 31. As herein shown, the sprocket 44 is turned one revolution by a one foot movement of tape 3. Shafts 47 and 63 are geared 1 to 6 so that one revolution of the former causes one sixth revolution of the latter. Ten revolutions of worm 65 produce one revolution of gear 66 and thus of shaft 31. Thus, a movement of float 2 through a distance of one foot will produce one sixtieth of a revolution of shaft 31 or an angular movement thereof of 6 degrees.

The potentiometers 59 and 64 are adapted to be connected in an electric circuit with a suitable measuring instrument to vary the current in such circuit and these variations are indicated on the instrument in feet and inches, the potentiometer 59 controlling the inch scale and the potentiometer 64 controlling the foot scale. This level-indicating apparatus is not completely shown herein because an understanding of its construction and operation is not essential to an understanding of the present invention.

There is also shown in Figs. 4 and 6 another form of level indicator at 67. This indicator is a register of the number wheel type, the indications of which in feet and inches are displayed through a window 68 in casing 8. The register 67 is driven by bevel gears 69 (Fig. 4) from a shaft 70, which is connected by a gear train 71 to shaft 58. The register 67 and gear train 71, gears 69 and shaft 70 are supported in a frame 72, fixed as indicated in Fig. 4 to the casing 8. The latter has a removable cover 73 which allows access to the mechanism mounted therein.

Figure 2:
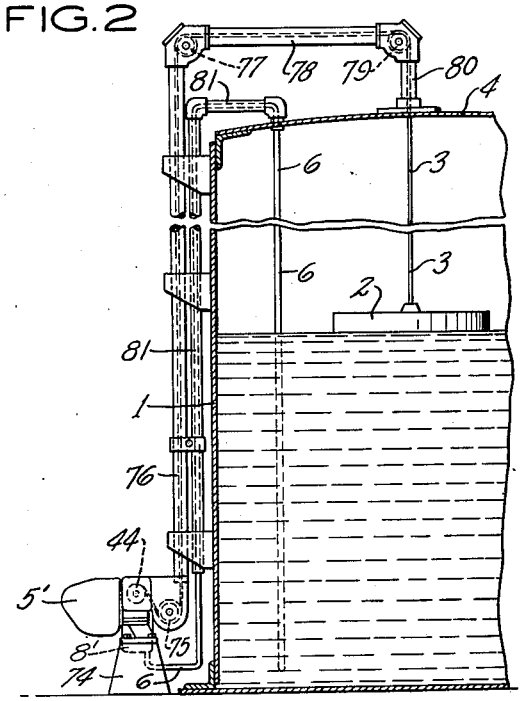
Fig. 2 is a similar view showing the apparatus mounted outside and near the bottom of the tank.

The mechanism described need not necessarily be mounted on the roof of the storage tank as shown in Fig. 1. An alternative mounting is shown in Fig. 2, in which casings 5' and 8', respectively corresponding to the described casings 5 and 8 and containing the same mechanisms, are mounted on a concrete base 74 near the ground. The casing 5' is extended horizontally to the right far enough to receive the second sprocket wheel 75. The tape 3 in leaving the sprocket 44 passes down and under sprocket 75 and thence upward through a vertical pipe 76 to a sprocket 77 and thence horizontally through a pipe 78 to a sprocket 79 and thence vertically downward through a pipe 80 into the storage tank. The resistor cable 6 extends through a conduit 81 to casing 8'. The conduit 81 and pipe 76 are suitably supported from the shell of the storage tank, as indicated.

In operation, the float 2, as it rises and falls in the storage tank 1 with changes in level of the liquid therein, causes the cam shaft 31 to be moved back and forth, or clockwise and counterclockwise, respectively, as viewed in Figs. 9 to 18, to control the series of switches 15. In the present example, because of the speed reduction mechanism interposed between the float 2 and shaft 31, a movement of one foot of the float causes a movement of 6° of the cam shaft, which has an angular range of 300° for the entire depth of 50 feet of tank 1. Therefore, the shaft 31 will move very slowly, and it is necessary that the contact-connecting member 25 of each switch 15 be actuated from one extreme position to the other by suitable snap-acting means, such as the toggle springs 26, when permitted by its controlling cam 33 on shaft 31. The spring 29 of each switch, as the biasing means, tends to hold the switch member 25 in the first of its two extreme positions, in which the contacts 16 and 17 of the first pair are connected and the contacts 18 and 19 of the second pair are disconnected. When the transition rise portion 42 of a cam 33 engages its follower 37, the snap-acting means is moved against the biasing means into its second position, in which the contacts 16 and 17 of the first pair are disconnected and the contacts 18 and 19 of the second pair are connected. This occurs at each of a plurality of predetermined angular positions of shaft 31, corresponding to a plurality of predetermined levels of liquid in tank 1. Each switch, after having been thus actuated, is held in actuated position by the high dwell portion 41 of its cam, if the level of liquid in tank 1 remains at or rises above the predetermined level. If the level of liquid falls, the cam 31 turns in the opposite direction (counterclockwise as viewed in Figs. 9 to 18) and as its follower 37 rides down the transition portion 42 of its cam 33 onto the low dwell portion 41 thereof, the biasing means 29 is released and allowed to move the snap-acting means 26 to its first position, thereby moving member 25 to disconnect the contacts 18 and 19 of the second pair and then connect the contacts 16 and 17 of the first pair. Figs. 9 through 18 respectively show the cams for the first through the tenth switch of the series and indicate the various angular positions at which the switches will be actuated and the various angular ranges during which they are actuated.

Referring to the diagram of Fig. 3, it will be seen that the circuit for each resistor 9, except the first and last ones of the series, which are not frequently used, includes in series two pairs of contacts, one pair in one switch of the series and another pair in the next switch of the series. No more than two pairs of contacts are ever included in the circuit of the measuring instrument. Thus, the resistance due to the selector switches is maintained as nearly uniform as possible, the only exception being in the circuits of the end resistors of the series which are less liable to be used.

The Fig. 3 diagram shows the switches as positioned when the level of liquid is below four feet. Each switch is in its normal position. Thus, the first pair of contacts 16 and 17 of each switch are connected and the second pair of contacts 18 and 19 of each switch are disconnected. The only resistor 9 then in the circuit of the measuring instrument 10 is the first one of the series. All other resistors of the series are disconnected from such circuit by the then disconnected second pair of contacts 18 and 19 of each switch. When the liquid in tank 1 rises to the level of four feet, the first switch 15 of the series will be actuated by the part 42 of its cam 33, causing the first pair of contacts 16 and 17 to be disconnected, thus disconnecting the first resistor 9 of the series from the circuit of the measuring instrument 10, and its second pair of contacts 18 and 19 to be connected, thus connecting the second resistor 9 of the series into the circuit of the measuring instrument. When the level of liquid in tank 1 rises to 6 feet, the second switch 15 of the series will be actuated, causing the second resistor 9 of the series to be disconnected and the third resistor of the series to be connected to the circuit of the measuring instrument. As the level of liquid in tank 1 continues to rise, the other switches will be actuated successively in order at the different levels indicated and other resistors of the series connected into the circuit of the measuring instrument. As the level of liquid in tank 1 falls, the various cams 33 will release their respective switches 15 in order and this will cause, at various predetermined positions named, the disconnection of a higher level resistor from, and the connection of the resistor for the next lower level to be connected to, the circuit of the measuring instrument.

The switch-actuating means described may obviously be reversed, if desired. That is the cams may turn in a direction opposite to that indicated in Fig. 8; the switches being held by the high dwells 41 of the cams in normal positions and successively actuated by their rollers riding down the portions 42 onto the low dwell portions of the cams. The left hand pair of contacts in Fig. 8 would then become the contacts 16 and 17 of the diagram of Fig. 3 and the right hand pair of contacts in Fig. 8 would then become the contacts 18 and 19 of the diagram. In the cam charts the position marked "End of the cycle" would become the start of the cycle, and the angular extent of the high dwell would be the same as the illustrated angular extent of the low dwell and vice versa, so that the switches can be successfully actuated at the same angular positions illustrated. The operation would not be changed by the described reversal of parts of the actuating mechanism.

It will be clear that with the described apparatus, whatever the level of liquid in tank 1 may be, there will always be connected in the circuit of the measuring instrument 10 one resistor 9 and that resistor will be the proper one for the particular depth of liquid in tank 1. That is, the active resistor in the circuit will be one having a length approximating the then existing depth of liquid in the tank. As the level changes to a sufficient degree, the resistor in the circuit is automatically changed. Thus, it is merely necessary to read the measuring instrument 10 which shows at all times within close limits the average temperature of the liquid in the storage tank.

What is claimed is:

1. In apparatus for measuring the average temperature of liquid in a storage tank, of the type wherein a series of resistors having equal resistance extend upwardly from the bottom of the tank and terminate at different levels, the resistance of each resistor being uniformly distributed over its length, and wherein such resistors are adapted to be selectively connected one at a time in an electrical circuit, which includes a measuring instrument responsive to changes of resistance in the circuit and which is adapted for connection to a source of electricity; an element movable in response to and proportionately with changes in level of the liquid in said tank, and switching means actuated by movement of said element for connecting said resistors one at a time in said circuit and operable when moved into each of a plurality of predetermined positions, to disconnect one resistor of the series from said circuit and connect into the latter a next succeeding resistor of the series.

2. In apparatus for measuring the average temperature of liquid in a storage tank, of the type wherein a series of resistors having equal resistance extend upwardly from the bottom of the tank and terminate at different levels, the resistance of each resistor being uniformly distributed over its length, and wherein such resistors are adapted to be selectively connected one at a time in an electrical circuit, which includes a measuring instrument responsive to changes of resistance in the circuit and which is adapted for connection to a source of electricity; an element movable in response to and proportionately with changes in level of the liquid in said tank, a series of switches successively actuated by said element one at each of a plurality of predetermined positions of said element; each switch including a first and a second pair of contacts initially held connected and disconnected respectively, said element actuating each switch to disconnect the contacts of the first pair and then connect the contacts of the second pair, each resistor except the end ones of the series being controlled by the second pair of contacts of one switch and the first pair of contacts of a next adjacent switch in the series, whereby as each switch is actuated by said element to connect another resistor of the series it disconnects the preceding resistor of the series.

3. In apparatus for measuring the average temperature of liquid in a storage tank, of the type wherein a series of resistors having equal resistance extend upwardly from the bottom of the tank and terminate at different levels, the resistance of each resistor being uniformly distributed over its length, and wherein such resistors are adapted to be selectively connected one at a time in an electrical circuit, which includes in series a conductor connected to one terminal of each resistor, a measuring instrument responsive to changes of resistance in the circuit and a second conductor, said circuit being adapted for connection to a source of electricity; an element movable in response to and proportionately with changes in level of the liquid in said tank, a series of switches successively actuated by said element one at each of a plurality of predetermined positions of said element; each switch including a first and a second pair of contacts initially held connected and disconnected respectively, said element actuating each switch to disconnect the contacts of the first pair and then connect the contacts of the second pair, said second conductor being connected to one contact of the first pair of each switch, and other conductors one for each resistor and each connecting the other terminal of its resistor to one contact of the second pair of a switch, and a conductor connecting the other contact of the first pair of each switch except the first switch of the series to the other contact of the second pair of the preceding switch of the series, the circuit for each resistor thus including in series the second pair of contacts of one switch and the first pair of contacts of the second switch, whereby as each switch is actuated to connect another resistor of the series in the circuit of said instrument, it disconnects the preceding resistor of the series.

4. Switch actuating mechanism comprising, a shaft adapted for connection to a level-responsive element of a liquid storage tank and to be moved back and forth by the rise and fall of liquid therein, a plurality of cams on said shaft, each having low and high dwell portions and a transition portion interconnecting the dwell portions, a plurality of switches mounted one adjacent each cam, each switch having a first and a second pair of contacts, snap-acting means movable from a first position, in which the contacts of the first pair are connected and the contacts of the second pair are disconnected, to a second position, in which the contacts of the first pair are disconnected and the contacts of the second pair are connected, and a follower riding on each cam and connected to the snap-acting means for moving the same into its second position, said follower being moved by said transition portion of the cam to actuate the snap-acting means into its second position and being held in the position to which it is moved by one dwell portion of the cam to hold the snap-acting means in its second position, the transition portions of the several cams being located in different angular positions on said shaft, said last-named dwell portion increasing in angular extent from the first cam to the last cam of the series.

5. Switch mechanism, comprising, a plurality of switches; each switch having a first and a second pair of contacts, a member movable from a first extreme position in which it connects the contacts of the first pair and disconnects the contacts of the second pair to a second extreme position in which it disconnects the contacts of the first pair and connects the contacts of the second pair, snap-acting means for moving the member from one said position to another, and means controlling the snap-acting means and tending to hold the member in said first position; a conductor adapted for connection to the circuit of a measuring instrument and a power source and connected to one contact of the first pair of each switch, a plurality of conductors one for each switch and each connected to one contact of the second pair of its switch and adapted for connection one to each of a plurality of resistors to be connected in said circuit, a conductor connecting the other contact of the first pair of each switch to the other contact of the second pair of the next adjacent switch of the series, said means being movable to actuate the switches one at a time to move its member from said first to said second position.

6. Switch mechanism, comprising, a plurality of switches; each switch having a first and a second pair of contacts, a member movable from a first extreme position in which it connects the contacts of the first pair and disconnects the contacts of the second pair to a second extreme position in which it disconnects the contacts of the first pair and connects the contacts of the second pair, snap-acting means for moving the member from one said position to another, and means controlling the snap-acting means and tending to hold the member in said first position; a conductor adapted for connection to the circuit of a measuring instrument and a power source and connected to one contact of the first pair of each switch, a plurality of conductors one for each switch and each connected to one contact of the second pair of its switch and adapted for connection one to each of a plurality of resistors to be connected in said circuit, a conductor connecting the other contact of the first pair of each switch to the other contact of the second pair of the next adjacent switch of the series, said controlling means adapted for connection to the level-responsive element of a liquid storage tank and to be moved back and forth by the rise and fall of liquid therein, the movement of said controlling means in one direction into each of various predetermined positions actuating the snap-acting means of a switch to move its member into said second position and in the other direction actuating the snap-acting means of a switch to move its member into said first position.

HARRY F. TAPP.
GEORGE D. ROBINSON.

REFERENCES CITED

The following references are of record in the file of this patent:

UNITED STATES PATENTS

| Number | Name | Date |
|---|---|---|
| 2,069,509 | Stickney | Feb. 2, 1937 |
| 2,088,819 | Smulski | Aug. 3, 1937 |
| 2,169,039 | Defandorf | Aug. 8, 1939 |
| 2,211,606 | Pratt | Aug. 13, 1940 |
| 2,589,714 | Lee | Mar. 18, 1952 |